United States Patent
Aratani et al.

(10) Patent No.: US 7,191,659 B2
(45) Date of Patent: Mar. 20, 2007

(54) SEALED DIAPHRAGM PRESSURE SENSOR

(75) Inventors: Masahiro Aratani, Okazaki (JP);
Takashige Saitou, Ama-gun (JP);
Yasuaki Makino, Okazaki (JP)

(73) Assignee: Denso Corporation, Kariya (JP)

( * ) Notice: Subject to any disclaimer, the term of this patent is extended or adjusted under 35 U.S.C. 154(b) by 94 days.

(21) Appl. No.: 10/974,696

(22) Filed: Oct. 28, 2004

(65) Prior Publication Data

US 2005/0132813 A1 Jun. 23, 2005

(30) Foreign Application Priority Data

Dec. 18, 2003 (JP) .............................. 2003-421338

(51) Int. Cl.
*G01L 7/08* (2006.01)
(52) U.S. Cl. .............................. 73/715; 73/753; 73/754
(58) Field of Classification Search .......... 73/700–756; 361/283.1–283.4
See application file for complete search history.

(56) References Cited

U.S. PATENT DOCUMENTS 4,827,095 A * 5/1989 Clark et al. ................. 200/83 J
5,595,939 A 1/1997 Otake et al.
2003/0019299 A1* 1/2003 Horie et al. .................. 73/718
2004/0201096 A1* 10/2004 Iijima et al. ................. 257/734

FOREIGN PATENT DOCUMENTS

JP 57168133 A * 10/1982 .................. 73/753

* cited by examiner

*Primary Examiner*—Edward Lefkowitz
*Assistant Examiner*—Jermaine Jenkins
(74) *Attorney, Agent, or Firm*—Posz Law Group, PLC

(57) ABSTRACT

A pressure sensor includes a pressure detecting chamber sectionally formed by a diaphragm for receiving measured pressure and a semiconductor chip having a diaphragm as a pressure-sensitive portion is equipped in the pressure detecting chamber. Electrically insulating pressure transmitting liquid for transmitting the measured pressure received by the diaphragm to the semiconductor chip is sealingly filled in the pressure detecting chamber. Also, an electrical circuit for signal processing is equipped around the pressure-sensitive portion at the surface site of the semiconductor chip. The electrical circuit is coated by protection film. Electrical conducting film set to ground potential is formed as the uppermost layer of the semiconductor chip on the surface of the protection film.

8 Claims, 4 Drawing Sheets

SEALED DIAPHRAGM PRESSURE SENSOR

CROSS REFERENCE TO RELATED APPLICATION

This application is based upon, claims the benefit of priority of, and incorporates by reference the contents of, Japanese Patent Application No. 2003-421338 filed on Dec. 18, 2003.

FIELD OF THE INVENTION

The present invention relates to a pressure sensor and, more particularly, to a sealed diaphragm pressure sensor.

BACKGROUND OF THE INVENTION

A sealed diaphragm pressure sensor has been proposed in JP-A-7-243926 (Patent Document 1). According to this pressure sensor, a pressure detecting chamber is sectionally formed by a metal diaphragm for receiving measured pressure in a case, a semiconductor chip having a pressure-sensitive portion is equipped in the pressure detecting chamber, and electrically insulating pressure transmitting liquid for transmitting the pressure received by the metal diaphragm to the semiconductor chip is sealingly filled in the pressure detecting chamber.

The pressure sensor includes a semiconductor chip having a pressure-sensitive portion, such as a diaphragm or the like formed on a silicon substrate. The pressure sensor also includes an integrated sensor chip for signal processing comprised of an electrical circuit disposed around the pressure-sensitive portion at a surface site of the semiconductor chip. The electrical circuit comprises transistor elements, etc. which are formed at the peripheral portion of the semiconductor chip by the semiconductor manufacturing technique. Furthermore, the surface of the electrical circuit is covered by protection film formed of silicon nitride film or the like in the semiconductor chip.

In the pressure sensor as described above, the measured pressure is applied to the surface of the metal diaphragm at the opposite side to the pressure detecting chamber, and the measured pressure is applied from the metal diaphragm through the pressure transmitting liquid to the pressure-sensitive portion of the semiconductor chip.

An electrical signal output from the pressure-sensitive portion on the basis of the measured pressure is amplified and adjusted by the electrical circuit and externally transmitted.

However, in the pressure sensor described above, the pressure transmitting liquid in the pressure sensor may be polarized under an electrostatic environment, so that the surface site of the semiconductor chip is electrified. Further, as disclosed in Patent Document 1, oil or the like is frequently used as the pressure transmitting liquid. Accordingly, charges occurring due to the electrification invade circuit elements such as a transistor element or the like constituting the electrical circuit, and cause malfunction of the electrical circuit of the semiconductor chip, thereby inducing variation of the sensor characteristics.

SUMMARY OF THE INVENTION

Accordingly, it is an object of the present invention to provide a sealed diaphragm pressure sensor in which malfunction of an electrical circuit associated with a semiconductor chip is prevented when the semiconductor chip is electrified by static electricity. The semiconductor chip is accommodated in a pressure detecting chamber, which is sectionally formed by a diaphragm, in a case and electrically insulating pressure transmitting liquid that sealingly fills the pressure detecting chamber.

In order to attain the above object, according to a first aspect, a pressure sensor in which a pressure detecting chamber is sectionally formed by a diaphragm for receiving measured pressure in a case, a semiconductor chip having a pressure-sensitive portion is equipped in the pressure detecting chamber, electrically insulating pressure transmitting liquid for transmitting the measured pressure received by the diaphragm to the semiconductor chip is sealingly filled in the pressure detecting chamber, an electrical circuit for signal processing is equipped around the pressure-sensitive portion at the surface site of the semiconductor chip and the electrical circuit is coated by protection film, is characterized in that electrical conducting film having electrical conductivity is formed as the uppermost layer of the semiconductor chip on the surface of the protection film coated on the electrical circuit, and the electrical conducting film is set to ground potential.

According to the first aspect, even when the pressure transmitting liquid is polarized by static electricity and the surface of the semiconductor chip is electrified, charges generated by electrification can be removed through the electrical conducting film set to the ground potential.

Accordingly, in the sealed diaphragm pressure sensor, even when the surface of the semiconductor chip is electrified by static electricity, malfunction of the electrical circuit of the semiconductor chip can be prevented.

According to a second aspect, in the pressure sensor of the first aspect, the electrical conducting film may be formed of aluminum film.

According to a third aspect, in the pressure sensor of the first or second aspect, the case is equipped with a GND terminal set to ground potential, and the electrical conducting film can be set to ground potential by electrically connecting the electrical conducting film to the GND terminal.

According to a fourth aspect, in the pressure sensor of the third aspect, the electrical conducting film is electrically connected to the GND terminal through a wire.

According to a fifth aspect, in the pressure sensor of any one of the first to fourth aspects, oil may be used as the pressure transmitting liquid.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
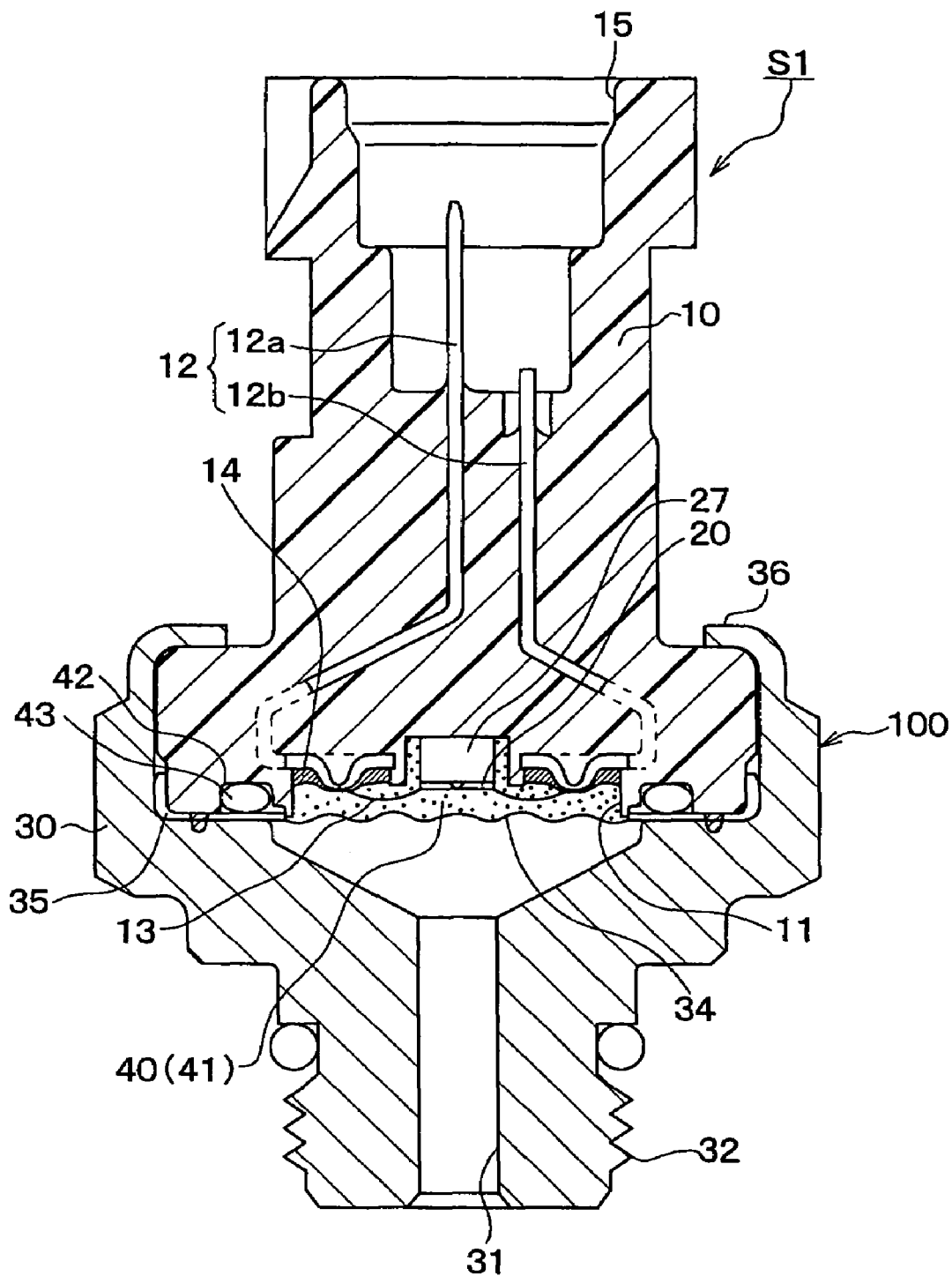
FIG. 1 is a cross-sectional view showing the overall construction of a pressure sensor according to a preferred embodiment.

A preferred embodiment according to the present invention will be described with reference to the accompanying drawings. In the respective figures, the same or equivalent parts are represented by the same reference numerals in order to simplify the description.

FIG. 1 is a cross-sectional view showing the overall construction of a pressure sensor S1 according to an embodiment of the present invention. As not limited to an application field, the pressure sensor S1 may be applied to detect refrigerant pressure in a refrigerant pipe of a vehicle air conditioner which is mounted in a vehicle, for example.

The pressure sensor includes a connector case 10 formed by die-forming resin such as PPS (polyphenylene sulfide), PBT (polybutylene terephthalate) or the like. The case 10 may be designed in, for example, a substantially column-shape. A recess portion 11 is formed at one end portion (the end portion at the lower side in FIG. 1) of the connector case 10 serving as a resin case.

A semiconductor chip 20 is disposed on the bottom surface of the recess portion 11 of the connector case 10. The semiconductor chip 20 is a sensor element for detecting pressure. The detailed construction of the semiconductor chip 20 is shown in FIGS. 2A, 2B and FIG. 3.

Figure 2A:
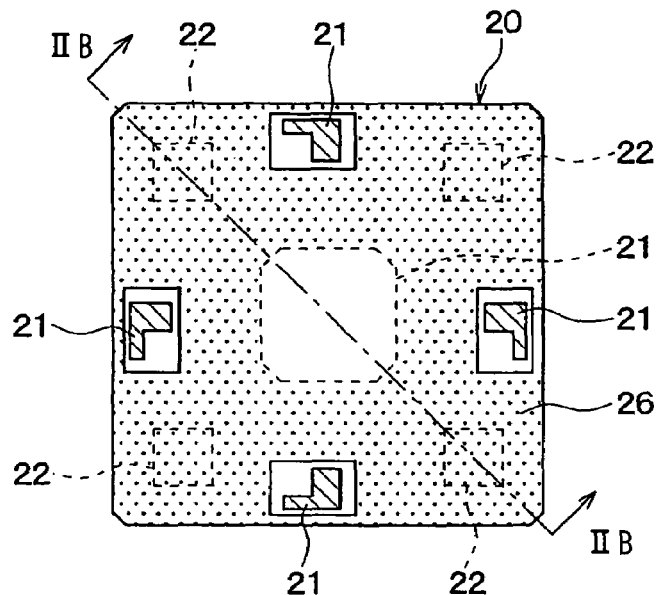
FIG. 2A is a plan view showing a pressure receiving face side of a semiconductor chip.
Figure 2B:
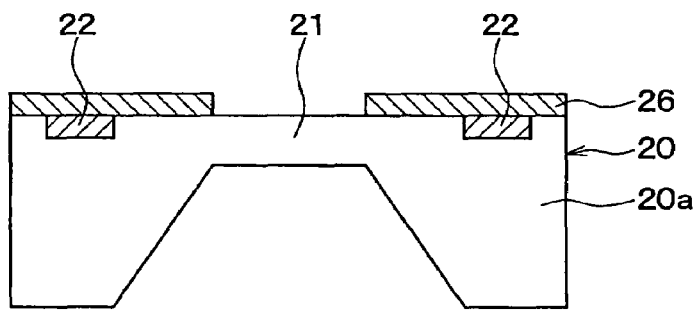
FIG. 2B is a cross-sectional view taken along a line IIB—IIB.
Figure 3:
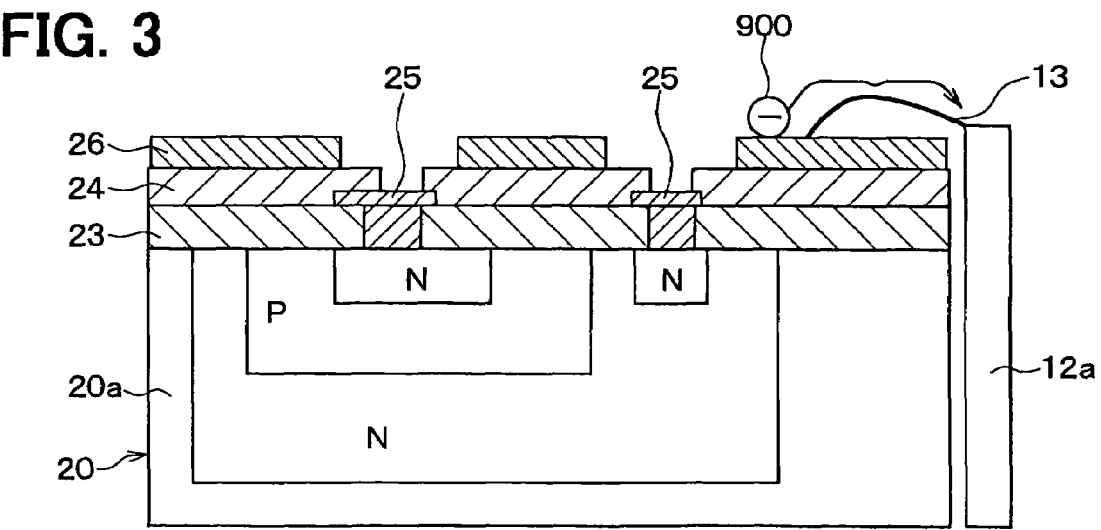
FIG. 3 is a cross-sectional view of an electrical circuit formed portion of the semiconductor chip shown in FIGS. 2A and 2B.

FIG. 2A is a plan view showing a pressure receiving face side, that is, a surface side of the semiconductor chip 20, and FIG. 2B is a cross-sectional view taken along line IIB—IIB of FIG. 2A. FIG. 3 is a cross-sectional view of an electrical circuit 22 portion of the semiconductor chip 20. The semiconductor chip 20 comprises a semiconductor diaphragm as a pressure sensitive element, which has a diaphragm 21 as a pressure-sensitive portion. The semiconductor chip 20 converts the pressure received by the diaphragm to an electrical signal and externally transmits the sensor signal.

Here, The diaphragm 21 is formed in connection with formation of a recess portion on the back surface of a silicon substrate portion 20a by performing anisotropic etching using alkali solution such as KOH (potassium hydroxide) or the like on the back surface of the silicon substrate portion 20a of the semiconductor chip 20.

In order to discriminate the diaphragm 21 of the semiconductor chip 20 from a metal diaphragm 34 used to form a pressure detecting chamber 40 described later, the diaphragm 21 of the semiconductor chip 20 will be hereunder referred to as "silicon diaphragm 21".

According to a general construction of the semiconductor diaphragm type semiconductor chip, in the semiconductor chip 20 of this embodiment, strain gage resistance layers (not shown) comprising impurity diffused layers or the like are also formed in the silicon diaphragm 21, and these resistance layers constitute a bridge circuit. An output variation of the bridge circuit which is caused by strain of the silicon diaphragm 21 is output as an electrical signal.

An electrical circuit 22 for signal processing is equipped around the silicon diaphragm 21 at the surface site of the semiconductor chip 20.

The electrical circuit 22 is used to amplify/adjust the electrical signal from the bridge circuit, and the signal-processed electrical signal is output as a sensor signal from the semiconductor chip 20.

As shown in FIG. 3, the electrical circuit 22 comprises circuit elements such as transistor elements, etc. and wire layers for connecting the circuit elements which are formed impurity diffusing layers of P-layer and N-layer in the silicon substrate portion 20a of the semiconductor chip 20 by semiconductor manufacturing techniques.

Silicon oxide film 23 and protection film 24 comprising silicon nitride film or the like are laminated on the formation portion of the electrical circuit 22 in the silicon substrate portion 20a of the semiconductor chip 20. That is, the electrical circuit 22 is coated by the protection film 24 in the semiconductor chip 20.

Contact holes are formed in the silicon oxide film 23 and the protection film 24 to expose pads 25. The pads 25 are formed of aluminum or the like, and designed as electrodes to provide an external connection to the electrical circuit 22 of the semiconductor chip 20.

Furthermore, electrical conducting film 26 having electrical conductivity is formed as the uppermost layer of the semiconductor chip 20 on the surface of the protection film 24 coated on the electrical circuit 22. The electrical conducting film 26 is set to ground potential.

The electrical conducting film 26 is aluminum film 26 formed of aluminum. As shown in FIG. 2A, the electrical conducting film 26 is formed in an area of the surface site of the semiconductor chip 20 other than the areas where the silicon diaphragm 21 and the pads 25 are formed.

The silicon oxide film 23, the protection film 24, the pads 25 and the aluminum film 26 may be formed by as shown in FIGS. 4A–4F and described later. Furthermore, in the semiconductor chip 20, the silicon oxide film 23 and the protection film 24 are also formed on the diaphragm 21.

As shown in FIG. 1, the semiconductor chip 20 is integrated with a seat 27 formed of glass or the like by anode bonding or the like, and the seat 27 is adhesively attached to the bottom surface of the recess portion 11 of the connector case 10. Accordingly, the semiconductor chip 20 is mounted on the connector case 10 through the seat 27.

A plurality of metal rod-shaped terminals 12 for electrically connecting the semiconductor chip 20 to an external circuit or the like is provided in the connector case 10.

The terminals 12 penetrate through the connector case 10 to function as an output terminal, a power source terminal, a GND terminal and an adjusting terminal in connection with the circuit construction of the semiconductor chip 20. Preferably, at least four terminals 12 are provided. However, in FIG. 1, only two terminals 12a of these terminals 12 are shown. In FIG. 1, the terminal 12a at the left side functions as the GND terminal while the terminal 12b at the right side functions as the adjusting terminal.

In this embodiment, these terminals 12 are formed of material achieved by subjecting plating treatment (for example, Ni plating) to brass, and they are formed integrally with the connector case 10 by insert mold, whereby the terminals 12 are held in the connector case 10.

The end portion of one end side (the lower end side in FIG. 1) of each terminal 12 is disposed so as to project from the bottom surface of the recess portion 11 of the connector case 10 to the inside of the recess portion 11 around the mount area of the semiconductor chip 20.

The end portion of the other end side (the upper end side in FIG. 1) of each terminal 12 is exposed to an open portion 15 at the other end side of the connector case 10.

The one end portion of each terminal 12 projecting into the recess portion 11 of the connector case 10 and the semiconductor chip 20 are wire-connected and electrically connected to each other by a bonding wire 13 of gold, aluminum or the like.

Here, the terminal 12a as the GND terminal provided to the connector case 10 is set to the ground potential, and in FIG. 3, the terminal 12a is schematically shown.

As shown in FIG. 3, the terminal 12a serving as the GND terminal and the aluminum film 26 serving as the conductive film are wire-connected to each other by bonding wire 13 to be electrically connected to each other. Accordingly, the aluminum film 26 is set to the ground potential.

Furthermore, as shown in FIG. 1, a seal agent 14 of silicon type resin or the like is provided in the recess portion 11 of the connector case 10. The gap between the base portion of the terminal 12 projecting into the recess portion 11 and the connector case 10 is sealed by the seal agent 14.

Still furthermore, in FIG. 1, the other end portion (the end portion at the upper side in FIG. 1) side of the connector case 10 is designed as the opening portion 15, and the opening portion 15 serves as a connector portion for electrically connecting the other end side of the terminal 12 to an external circuit (ECU of a vehicle or the like) or the like through an external wire member (not shown) such as a wiring harness or the like.

That is, the other end side of each terminal 12 exposed into the opening portion 15 is allowed to be electrically connected to the external by the connector portion. Accordingly, signal transmission between the semiconductor chip 20 and the external is carried out through the bonding wire 13 and the terminal 12.

The terminal 12b serving as the adjusting terminal is a terminal for adjusting sensor characteristics at a time of manufacture. Therefore, the projecting length thereof in the opening portion 15 is set to be shorter than the other terminal 12a. More fully, the terminal 12b is designed so that it is not connected to the external when the sensor is used.

Next, as shown in FIG. 1, a housing 30 is assembled to one end portion of the connector case 10. The housing 30 is formed of metal material such as stainless (SUS) or the like, and has a pressure introducing hole 31 through which measured pressure is introduced from a measurement target object, and a screw portion 32 for fixing a pressure sensor S1 to the measurement target object. As described above, a refrigerant pipe of an air conditioner for a vehicle or the like may be applied as a measurement target object, and the pressure being measured may be refrigerant pressure in the refrigerant pipe or the like.

Furthermore, the metal diaphragm 34 of thin metal (for example, SUS or the like) and a presser member (ring weld) 35 of metal (for example, SUS or the like) are welded to the housing 30 on the overall periphery thereof, and air-tightly joined to one end of the pressure introducing hole 31. Accordingly, the measured pressure introduced from the pressure introducing hole 31 is received by the metal diaphragm 34.

The end portion of the housing 30 is caulked to one end portion of the connector case 10 to thereby form a caulk portion 36, and thus the housing 30 and the connector case 10 are fixed to each other and integrated with each other.

In the connector case 10 and the housing 30 thus fabricated, the pressure detecting chamber 40 is constructed between the recess portion 11 of the connector case 10 and the metal diaphragm 34 of the housing 30.

Furthermore, oil 41 comprising pressure transmitting liquid having electrical insulation is sealingly filled in the pressure detecting chamber 40. For example, fluorine-based oil or the like is used as the oil 41.

The oil 41 is filled in the recess portion 11 of the connector case 10 so as to cover the electrical connection portion of the semiconductor chip 20, the bonding wire 13, etc., and further the oil 41 is covered and sealed by the metal diaphragm 34.

By constructing the pressure detecting chamber 40 as described above, the pressure introduced from the pressure introducing hole 31 is applied through the metal diaphragm 34 and oil 41 to the semiconductor chip 20 in the pressure detecting chamber 40.

An annular groove (O-ring groove) 42 is formed at the outer peripheral portion of the pressure detecting chamber 40, and an O-ring 43 is disposed in the groove 42. Accordingly, the pressure detecting chamber 40 is air-tightly sealed by the O-ring 43.

The O-ring 43 is formed of elastic material such as silicon rubber or the like, and sandwiched and pressed by the connector case 10 and the press member 35. The pressure detecting chamber 40 is sealed and closed by the diaphragm 34 and the O-ring 43.

<Manufacturing Method, etc.>

Next, a method for manufacturing the pressure sensor S1 shown in FIGS. 2A, 2B and 3 will be described with reference to FIGS. 4A–4F. The semiconductor chip 20 may be manufactured according to a method of carrying out the manufacturing process on wafer and finally dicing the wafer into chips, or a method of proceeding the manufacturing process on each chip from beginning to end.

In FIGS. 4A–4F, the silicon substrate portion 20a, the protection film 24 and the aluminum film 26 are shown, and the internal construction of the silicon substrate portion 20a such as the electrical circuit 22, etc. and the silicon oxide film 23 are omitted.

Figure 4A:
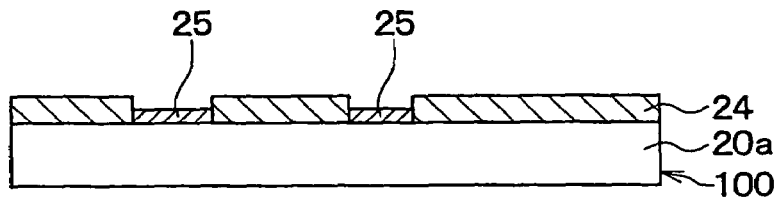
FIGS. 4A to 4F are cross-sectional views showing a method of manufacturing the pressure sensor according to a preferred embodiment.

First, as shown in FIG. 4A, the bridge circuit and the electrical circuit 22 are formed in the silicon substrate portion 20a, and the silicon oxide film, the protection film 24 and the pads 25 are formed thereon, to thereby prepare a substrate 100. Here, the silicon diaphragm 21 has not yet been formed on the substrate 100.

The substrate 100 as described above can be manufactured by using well-known semiconductor manufacturing techniques such as ion implantation or diffusion, the film forming method such as sputtering, deposition or the like, the photolithography method or the patterning method such as etching, mask formation or the like.

Figure 4B:
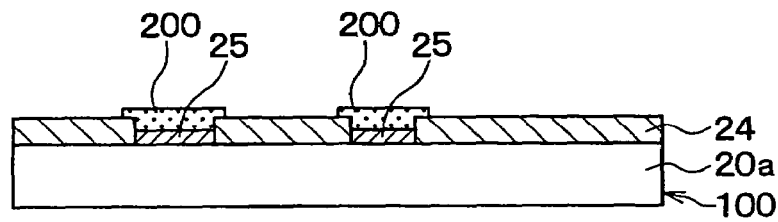

Subsequently, as shown in FIG. 4B, first masking members 200 are selectively disposed on the pads 25. The arrangement of the first masking members 200 is performed by using resist material or the like according to the photolithography method.

Figure 4C:
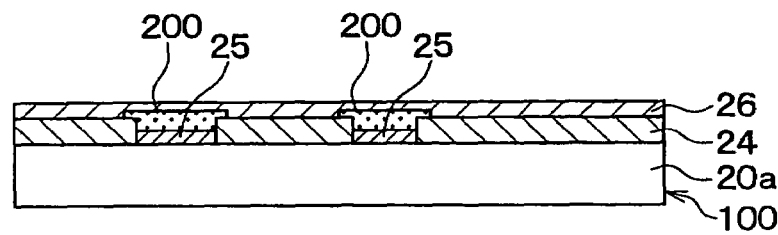

Subsequently, as shown in FIG. 4C, aluminum film 26 is formed on the protection film 24 and the masking member 200 on the substrate 100 by the deposition method or the like.

Figure 4D:
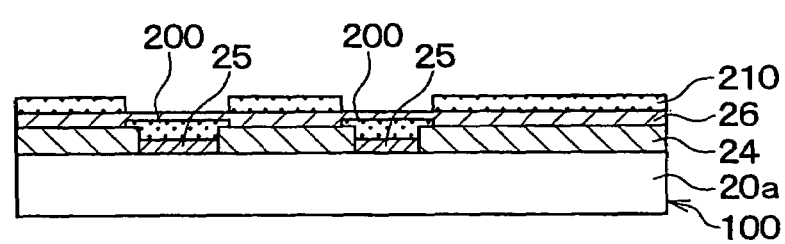

Subsequently, as shown in FIG. 4D, a second masking member 210 is formed on the aluminum film 26. The second masking member 210 is formed so that it is not formed on the pads 25 and the site serving as the silicon diaphragm 21.

Figure 4E:
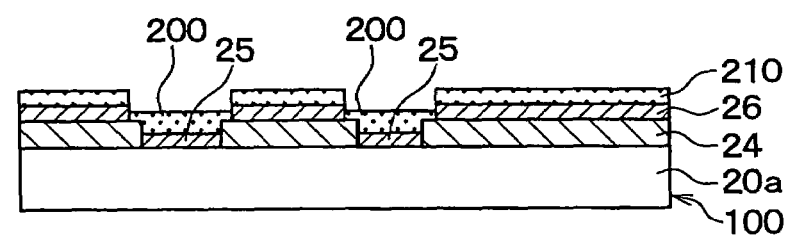

Subsequently, as shown in FIG. 4E, etching or the like is carried out by using the second masking member 210 as a mask to conduct patterning on the aluminum film 26 located on the pads 25 and the site serving as the silicon diaphragm 21.

Figure 4F:
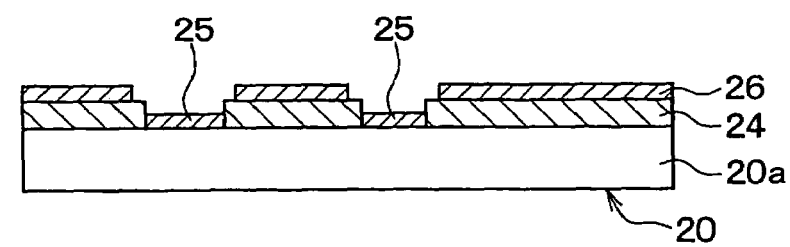

As shown in FIG. 4F, the first masking member 200 and the second masking member 210 are removed.

Thereafter, under the state that the surface side of the substrate 100 is masked, the back side of the silicon substrate portion 20*a* of the substrate 100 is etched or the like to form the silicon diaphragm 21, whereby the semiconductor chip 20 shown in FIGS. 2 and 3 is completed.

Next, the pressure sensor S1 is manufactured by using the semiconductor chip 20.

First, the connector case 10 in which the terminals 12 are formed by insert molding is prepared. The semiconductor chip 20 is adhesively attached to the recess portion 11 of the connector case 10 through the seat 21 by using adhesive agent formed of silicon resin or the like.

The seal agent 14 is poured into the recess portion 11 of the connector case 10 so as to pervade to the bottom surface of the recess portion 11. Here, the injection amount of the seal agent 14 is adjusted so that the seal agent 14 does not adhere to the surface of the semiconductor chip 20.

Subsequently, the seal agent 14 thus poured is hardened. The one end portion of each terminal 12 and the semiconductor chip 20 are wire-connected to each other by a bonding wire 13, and electrically connected to each other. At this time, the aluminum film 26 corresponding to the uppermost layer of the semiconductor chip 20 and the terminal 12*a* serving as the GND terminal are electrically connected to each other by the bonding wire 13.

The connector case 10 is disposed with the semiconductor chip 20 side placed face up, and a fixed amount of oil 41 formed of fluorine oil or the like is poured from the upper side of the connector case 10 into the recess portion 11 of the connector case 10 by a dispenser or the like.

Subsequently, the metal diaphragm 34 and the press member 35 are welded on the overall peripheral portion, and the housing 30 which is air-tightly joined to one end of the pressure introducing hole 31 is prepared, and dropped from the upper side while being maintained at a horizontal position to be engaged with the connector case 10. The result is put into a vacuum chamber while maintaining the above state, and vacuum suction is performed to remove extra air in the pressure detecting chamber 40.

Thereafter, the connector case 10 and the press member 35 at the housing 30 side are pressed against each other until they are sufficiently brought into contact with each other, thereby forming the pressure detecting chamber 40 sealed by the metal diaphragm 34 and the O-ring 43.

Subsequently, the end portion of the housing 30 is caulked to the one end side of the connector case 10 to form a caulk portion 36. By integrating the housing 30 and the connector case 10 as described above, the assembling and fixing of the connector case 10 and the housing 30 by the caulk portion 36 are performed, thereby completing the pressure sensor S1.

The basic pressure detecting operation of the pressure sensor S1 will be described.

In an exemplary operation environment, the pressure sensor S1 is secured to a proper place of a refrigerant pipe system of an air conditioner for a vehicle through a screw portion 32 of the housing 30. Pressure intended to me measured (measurement pressure) is introduced into the pressure sensor S1 by the pressure introducing hole 31 of the housing 30.

At this time, the measurement pressure thus introduced is received by the metal diaphragm 34, and transmitted from the metal diaphragm 34 to the semiconductor chip 20 through the oil 41 in the pressure detecting chamber 40. Accordingly, the measurement pressure is applied to the surface of the semiconductor chip 20. More particularly, the measurement pressure is applied to the pressure receiving face of the semiconductor chip 20, so that the silicon diaphragm 21 is distorted.

An electrical signal corresponding to the applied pressure is output from the bridge circuit on the silicon diaphragm 21, subjected to signal processing in the electrical circuit 22 of the semiconductor chip 20 and output as a sensor signal from the semiconductor chip 20.

The sensor signal is transmitted from the semiconductor chip 20 through the bonding wire 13 and the terminals 12 to the external circuit or the like, thereby detecting the refrigerant pressure of the refrigerant pipe. As described above, the pressure detection of the pressure sensor S1 is carried out.

<Effect, etc.>

According to this embodiment, the sealed diaphragm pressure sensor S1 described below is provided.

First, as the basic construction, the pressure detecting chamber 40 is sectionally formed by the metal diaphragm 34 for receiving the measurement pressure and the connector case 10.

Furthermore, the semiconductor chip 20 having the silicon diaphragm 21 serving as the pressure-sensitive portion is equipped in the pressure detecting chamber 40, and also oil 41 serving as the electrically insulating pressure transmitting liquid for transmitting the measurement pressure received by the metal diaphragm 34 to the semiconductor chip 20 is sealingly filled in the pressure detecting chamber 40.

Furthermore, the electrical circuit 22 for the signal processing is equipped around the diaphragm 21 at the surface site of the semiconductor chip 20, and also the electrical circuit 22 is covered by the protection film 24.

In this embodiment, in the pressure sensor S1 having the above basic construction, the electrical conducting film 26 having the electrical conductivity as the uppermost layer of the semiconductor chip 20 is formed on the surface of the protection layer 24 covered on the electrical circuit 22, and the electrical conducting film 26 is set to the ground potential.

According to this embodiment, even when the oil 41 as the pressure transmitting liquid is polarized by static electricity and the surface of the semiconductor chip 20 is electrified, the charges 900 occurring due to the electrification can be removed through the aluminum film 26 as the electrical conducting film is set to the ground potential as shown in FIG. 3.

Specifically, in this embodiment, the aluminum film 26 is electrically connected to the terminal 12*a* as the GND terminal through the bonding wire 13, and thus the charges 900 occurring due to electrification charges from the aluminum 26 through the wire 13 to the terminal 12*a*.

Accordingly, the semiconductor chip 20 according to the present embodiment having the pressure-sensitive portion 21 and the electrical circuit 20 is accommodated in the pressure detecting chamber 40 which is sectionally formed by the diaphragm 34 and the case 10. Also, even when the surface of the semiconductor chip 20 is electrified by static electricity in the sealed diaphragm pressure sensor in which the electrically insulating pressure transmitting liquid 41 is sealed, the malfunction of the electrical circuit 22 of the semiconductor chip 20 can be prevented.

Figure 5:
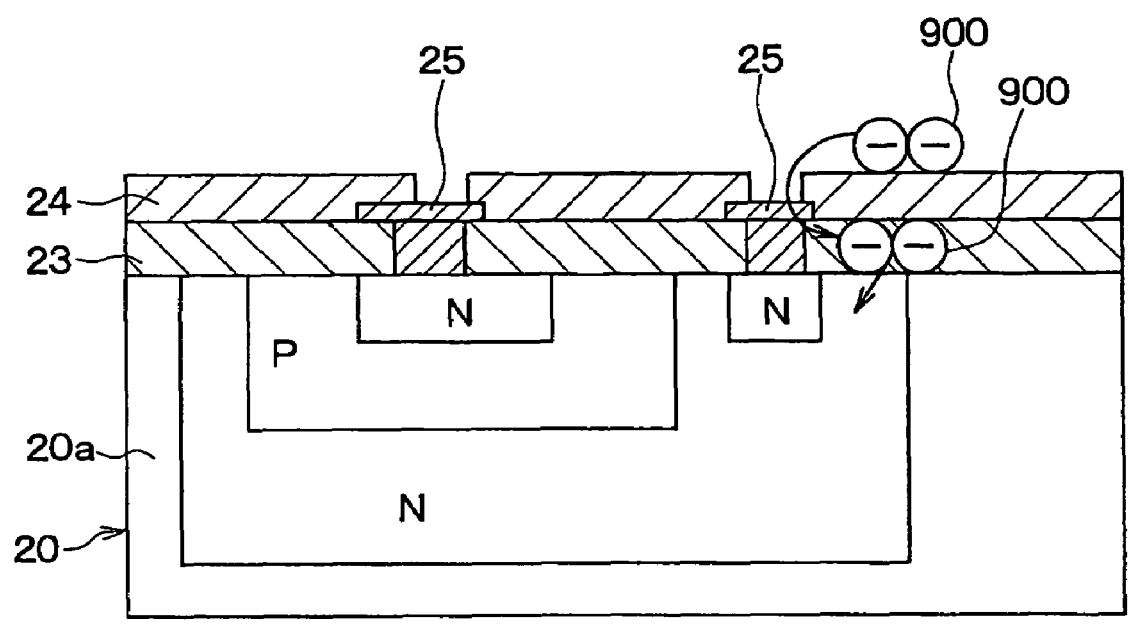
FIG. 5 is a cross-sectional view showing an electrical circuit formed portion of a semiconductor chip of a related art pressure sensor.

FIG. 5 is a cross-sectional view of the formation portion of the electrical circuit 22 of the semiconductor chip 20 in a related art pressure sensor. In this case, the aluminum film 26 is not formed, which differs from the present embodiment.

Even in the case of the related art semiconductor chip 20 shown in FIG. 5, the pressure transmitting liquid is polarized under electrostatic environment, and the surface site of the semiconductor chip 20, that is, the protection film 24 is electrified. At this time, the charges 900 occurring due to the electrification are passed from the surface side of the semiconductor chip 200 through the pads 25 and then invade into the circuit element such as the transistor element or the like constituting the electrical circuit 22.

Therefore, in the related art pressure sensor, the malfunction of the electrical circuit 22 in the semiconductor 20 occurs, and variation of the sensor characteristic is induced. On the other hand, this embodiment avoids such a problem as described above.

In the related art pressure sensor, a pad connected to a GND terminal exists in the pads 25 of the semiconductor chip 20. However, it has been difficult to remove electrification occurring on the overall surface of the semiconductor chip 20 by a pad having a small area.

In this embodiment, by forming the electrical conducting film 26 of aluminum 26 of aluminum, it is possible to properly form an electrical conducting film 26 by using a normal semiconductor manufacturing technique.

Furthermore, in this embodiment, the aluminum film 26 as the electrical conducting film is set to the ground potential by using the GND terminal 12a which is originally provided to the case 10 in this type of pressure sensor, so that the construction can be simplified.

(Other Embodiments)

In the above embodiment, the electrical conducting film 26 is electrically connected to the terminal 12a as the GND terminal through the boding wire 13. However, the electrical conducting film 26 and the terminal 12a may be connected to each other by soldering, electrical conducting adhesive agent or other conductive member in place of the wire.

The electrical conducting film 26 may be set to the ground potential by using a method other than the method of connecting the electrical conducting film 26 to the terminal 12a as the GND terminal. For example, a site to be set to the ground potential, except for the terminals, may be provided to the pressure sensor so that the electrical conducting film 26 is conducted to the site.

Any other film than the aluminum film may be used as the electrically conducting film 26 insofar as it has electrical conductivity.

Furthermore, any other oil than the fluorine type oil may be properly used as the oil (pressure transmitting liquid) insofar as it has electrical insulation property.

Still furthermore, the pressure transmitting liquid is not limited to oil, and any material may be used insofar as it is liquid having electrical insulation and the measurement pressure received by the diaphragm 34 can be properly transmitted to the semiconductor chip 20.

The diaphragm and the case which sectionally form the pressure detecting chamber 40 are not limited to the metal diaphragm and the connector case respectively, and the material and shape thereof may be properly modified.

In short, according to the present invention, it is characterized that in the sealed diaphragm pressure sensor in which the semiconductor chip 20 having the pressure-sensitive portion 21 and the electrical circuit 22 is accommodated in the pressure detecting chamber 40 sectionally formed by the diaphragm 34 and the case 10 and the electrically insulating pressure transmitting liquid 41 is sealingly filled in the pressure detecting chamber, the electrical conducting film 26 having electrical conductivity is formed as the uppermost layer of the semiconductor chip on the surface of the protection film 24 coated on the electrical circuit 22 of the semiconductor chip 20, and the electrical conducting film 26 is set to the ground potential.

The other portions are not limited to those of the above embodiment, and various design modifications may be made.

What is claimed is:

1. A pressure sensor having a pressure detecting chamber sectionally formed by a diaphragm for receiving measured pressure and a case, wherein a semiconductor chip having a pressure-sensitive portion is disposed in the pressure detecting chamber, wherein electrically insulating pressure transmitting liquid for transmitting the measured pressure received by the diaphragm to the semiconductor chip is sealingly filled in the pressure detecting chamber, wherein an electrical circuit for signal processing is disposed around the pressure-sensitive portion at the surface site of the semiconductor chip, wherein the electrical circuit is coated by a protection film, the pressure sensor comprising:
   electrical conducting film set to ground potential formed as the uppermost layer of the semiconductor chip on the surface of the protection film coating the electrical circuit, wherein the electrical conducting film is included on the semiconductor chip in areas other than where the pressure-sensitive portion is included, and wherein the electrical conducting film removes charges resulting from electrification when the electrically insulating pressure transmitting liquid is polarized by static electricity.

2. The pressure sensor according to claim 1, wherein the electrical conducting film is formed of aluminum film.

3. The pressure sensor according to claim 1, wherein the case includes a GND terminal set to the ground potential, and the electrical conducting film is electrically connected to the GND terminal.

4. The pressure sensor according to claim 3, wherein the electrical conducting film is electrically connected to the GND terminal through a wire.

5. The pressure sensor according to claim 1, wherein the pressure transmitting liquid is oil.

6. The pressure sensor according to claim 1, wherein the electrical conducting film includes at least one aperture for exposing the pressure sensitive portion to the electrically insulating pressure transmitting liquid and such that the electrical conducting film is included in areas other than where the pressure-sensitive portion of the chip is included.

7. A pressure sensor comprising:
   a pressure detecting chamber defined by a metallic diaphragm for receiving measured pressure and a connector case;
   a semiconductor chip disposed in the pressure detecting chamber, wherein the semiconductor chip includes:
     a diaphragm;
     an electrical circuit for signal processing disposed around the diaphragm and on a surface of the semiconductor chip; and
     electrical conducting film set to ground potential disposed on the semiconductor chip to coat the electrical circuit; and
   electrically insulating pressure transmitting liquid sealingly filling the pressure detecting chamber, wherein the electrically insulating pressure transmitting liquid transmits the measured pressure received by the metallic diaphragm to the semiconductor chip,
wherein the electrical conducting film is disposed on the semiconductor chip in areas other than where the diaphragm is disposed, and wherein the electrical conducting film removes charges resulting from electrification when the electrically insulating pressure transmitting liquid is polarized by static electricity.

8. The pressure sensor according to claim 7, wherein the electrical conducting film includes at least one aperture for exposing the diaphragm to the electrically insulating pressure transmitting liquid and such that the electrical conducting film is disposed on the semiconductor chip in areas other than where the diaphragm is disposed.

* * * * *